(12) United States Patent
Müller (10) Patent No.: US 12,406,470 B2
(45) Date of Patent: Sep. 2, 2025

(54) APPARATUS FOR OPTICAL IMAGE RECOGNITION AND CLASSIFICATION

(71) Applicant: Technische Universität Wien, Vienna (AT)

(72) Inventor: Thomas Müller, Vienna (AT)

(73) Assignee: Technische Universität Wien, Vienna (AT)

( * ) Notice: Subject to any disclaimer, the term of this patent is extended or adjusted under 35 U.S.C. 154(b) by 372 days.

(21) Appl. No.: 18/023,400

(22) PCT Filed: Aug. 28, 2020

(86) PCT No.: PCT/EP2020/074074
§ 371 (c)(1),
(2) Date: Feb. 27, 2023

(87) PCT Pub. No.: WO2022/042851
PCT Pub. Date: Mar. 3, 2022

(65) Prior Publication Data
US 2023/0274529 A1    Aug. 31, 2023

(51) Int. Cl.
*G06V 10/764* (2022.01)
*G06T 7/10* (2017.01)

(52) U.S. Cl.
CPC .............. *G06V 10/764* (2022.01); *G06T 7/10* (2017.01); *G06T 2207/20084* (2013.01)

(58) Field of Classification Search
None
See application file for complete search history.

(56) References Cited

U.S. PATENT DOCUMENTS

| 2008/0158137 A1* | 7/2008 | Yoshida | G09G 3/3648 |
| | | | 250/214 A |
| 2015/0296162 A1* | 10/2015 | Kurokawa | H10F 39/199 |
| | | | 257/43 |

(Continued)

OTHER PUBLICATIONS

Lukas Mennel et al: "Real-time image processing with a 2D semiconductor neural network vision sensor", Arxiv.org, Cornell University Library, 201 Olin Library Cornell University Ithaca, NY 14853, Aug. 31, 2019 (Aug. 31, 2019), XP081472744, abstract p. 1-p. 9.

(Continued)

*Primary Examiner* — Soo Shin
(74) *Attorney, Agent, or Firm* — Dykema Gossett PLLC (57) ABSTRACT

The invention relates to an apparatus for optical image recognition and classification, comprising an optical setup (10) to split the optical image into n=1, 2, N local optical power values $P_n$, a detector array (1) with n=1, 2, . . . N photoactive pixels (2, 2', 2") to pick up the local optical power values $P_n$, wherein each pixel (2, 2', 2") is segmented into m=1, 2, . . . M subpixels (3), and each subpixel (3) comprises a semiconductor photodiode which, under optical illumination, delivers a photocurrent $I_{mn}$ depending on its photoresponsivity $R_{mn}$ and the local optical power $P_n$ received at the pixel (2, 2', 2"), and wherein the photoresponsivity values $R_{mn}$ are not identical, and the outputs of each subpixel (3) are connected to form M output lines (4), wherein each output line (4) sums the photodetector currents produced by the m-th subpixels (3) in all N pixels (2, 2', 2") and delivers a detector current of Formel (I), to be used for recognizing and classifying the optical image.

21 Claims, 7 Drawing Sheets

(56) References Cited

U.S. PATENT DOCUMENTS

2015/0357360 A1* 12/2015 Tian .................... H10F 39/1847
250/208.2
2023/0266291 A1* 8/2023 Myrick ................ G01N 31/223

OTHER PUBLICATIONS

Mennel Lukas et al: "Ultrafast machine vision with 2D material neural network image sensors", Nature, Macmillan Journals Ltd., Etc, London, vol. 579, No. 7797, Mar. 1, 2020 (Mar. 1, 2020), pp. 62-66, XP037050108, ISSN: 0028-0836, DOI: 10.1038/S41586-020-2038-X [retrieved on Mar. 4, 2020].

Winnie Wong: "Design of A Saccadic Active Vision System", Jan. 1, 2006 (Jan. 1, 2006), XP055219872, Retrieved from the Internet: URL:http://www.cse.yorku.ca/visor/resources/ThesisWinnieWong.pdf [retrieved on Oct. 9, 2015] Section II.

Simeon Symeonidis et al: "Electro-optical systems and neural-inspired processing: a system architecture and technology analysis with applications to law enforcement small arms fire indication systems", Aug. 1, 2009 (Aug. 1, 2009), XP055154769, Retrieved from the Internet: URL:https://repositories.tdl.org/ttu-ir/bitstream/handle/2346/18767/Symeonidis_Simeon_Diss.pdf?sequence=1 [retrieved on Nov. 25, 2014].

\* cited by examiner

APPARATUS FOR OPTICAL IMAGE RECOGNITION AND CLASSIFICATION

CROSS-REFERENCE TO RELATED APPLICATIONS

This application is a national stage filing based upon International application No. PCT/EP2020/074074, filed 28 Aug. 2020.

FIELD OF THE INVENTION

The invention relates to an improved apparatus for optical image recognition and classification.

BACKGROUND

Optical Image sensors are an integral part of various machine vision apparatus for intelligent systems, including autonomous vehicles and robotics. It is known to capture optical images by a frame-based camera, convert them using analog-digital-converters into an electronic digital representation, and process it using machine-learning algorithms such as, for example, an artificial neural network (ANN). Such ANNs typically comprise several layers of interconnected computational units (synapses) whose connections can be adjusted, allowing the network to be trained to perform tasks such as classifying images. The large amount of (mostly redundant) data passed through the several layers from the optical image sensor to the output layer of the ANN, however, results in low speed and high power-consumption.

BRIEF SUMMARY OF THE INVENTION

It is an object of this invention to solve this and other problems of common optical image sensors and to provide an apparatus which enables a fast, robust, and efficient recognition and classification of optical images.

This and other objects are achieved by an apparatus according to claim 1.

An apparatus according to the invention comprises an optical setup to split an optical image into n=1, 2, . . . , N local optical power values $P_n$. Such optical setup might comprise mirrors, lenses, or polarizers to project the image to be recognized and classified onto a detector array. It may also be a simple lens arrangement, such as in a digital camera apparatus.

The apparatus according to the invention further comprises a detector array comprising a number of n=1, 2, . . . N photoactive pixels to pick up the local optical power values $P_n$. Such photoactive pixels preferably comprise semiconductor photodiodes which are operated under short-circuit conditions, so that under optical illumination, they deliver a measurable output current. The number of pixels N is not inherently limited, it might be, for example, around 10 000-1 000 000 for typical applications, comparable to the resolution of typical optical sensor arrangements. The pixels might be arranged in a round, rectangular, or quadratic area, or any other shape, depending on the application.

According to the invention, each pixel is segmented into subpixels, preferably a number of m=1, 2, . . . M subpixels, wherein each subpixel comprises a semiconductor photodiode with a photoactive area which, under optical illumination, delivers a photocurrent $I_{mn}$ depending on its photoresponsivity $R_{mn}$ and the local optical power $P_n$ received at the pixel. The number of subpixels per pixel might be 2, 3, 4, 5, 6, or higher, and the subpixels might be arranged in a line, a circle, or any rectangular or quadratic arrangement at different locations within a pixel. There is no inherent limit on the number of subpixels per pixel. Depending on the application, a matrix arrangement of 2×2, 2×3, or more subpixels per pixel might be provided, but a linear array or a circular arrangement of subpixels are feasible as well. The pixels might all have the same or a different number of subpixels.

Upon illumination with $P_n$, each subpixel delivers an electric current depending on its inherent photoresponsivity value $R_{mn}$. According to the invention, the photoresponsivity values $R_{mn}$ of the subpixels within a pixel are not identical and can thus be used as weights to set up an artificial neural network to recognize and classify the optical image represented by the values of $P_n$. For this, the outputs of the subpixels of each pixel are connected in parallel to form separate output lines, wherein each output line sums the photodetector currents produced by different subpixels within the pixels. The detector currents $I_m$ can be expressed as a function of the photoresponsivity values $R_{mn}$ and local optical power $P_n$ as follows:

$$I_m = \sum_{n=1}^{N} I_{mn} = \sum_{n=1}^{N} R_{mn} P_n$$

The M detector currents can then be used for recognizing and classifying the optical image in an external or integrated electronic classifier circuitry of an artificial neural network (ANN). The detector array itself thus performs a real-time multiplication of the optical power $P_n$ values with the adjustable photoresponsitivity matrix $R_{mn}$. The subpixels are then used as artificial neurons, and a training of the network requires setting the photoresponsitivity values $R_{mn}$ of each subpixel individually as weights. Thus, an apparatus according to the invention enables computer-implemented methods to recognize and classify optical images using the apparatus as an ANN. In an initial supervised or unsupervised training step, a set of predefined images can be used to set or adjust the weights $R_{mn}$ of each subpixel individually. In a following classification step, a projected optical image can be classified by a classifier circuitry based on the detector currents $I_m$. This enables the realization of an extremely fast, hardware-implemented ANN for image classification.

Each pixel may be segmented into m=1, 2, . . . , M subpixels, and the outputs of the subpixels of each pixel may be connected to form M output lines. The number of subpixels within each pixel may be identical to the number M of output lines in some embodiments, but it may be smaller or larger than M in other embodiments. The subpixels may each comprise a photodiode realized as a semiconductor transistor with a semiconductor channel contacted by a source contact and a drain contact, wherein the source contact is grounded, and the drain contact forms the output line of the subpixel. The channel may be of Si, GaAs, or any other semiconductor. Schottky contacts may be formed between the channel and the source and drain contacts.

In an embodiment of the invention, the photoresponsivity values $R_{mn}$ of the subpixels are not adjusted during operation, but are initialized during the training period and stay fixed during operation. This can be achieved during fabrication of the photodiodes by setting the photoactive area of each subpixel differently, corresponding to the desired value of $R_{mn}$. Here, the photoactive area denotes the illuminated area of the photodiode, wherein the resulting photocurrent is directly proportional to the photoactive area. This embodiment has the advantage that the apparatus can operate without supply voltage; the values of $R_{mn}$ do not have to be set actively. Under illumination, the photodiodes deliver an electric current which is directly proportional to $P_n$ and its photoactive area.

The necessary photoactive areas to provide photoresponsivity values $R_{mn}$ for a given single-purpose application might be predetermined prior to fabrication by means of initial simulations or experiments.

In an alternative embodiment, the photoresponsivity values $R_{mn}$ of the subpixels are actively adjustable during operation, preferably by electrical means. This can be achieved if a lateral p-n junction is formed in the channel of the photodiodes. The built-in field of this junction can be influenced by two laterally displaced gate electrodes, the first gate electrode near the source contact, and the second gate electrode near the drain contact. The voltages at the gate electrodes influence the p-n junction, and can thus be used to actively set or adjust the photoresponsivity of the subpixel. In this embodiment, the photoactive area of each subpixel might be identical.

The first and second gate electrodes can be embedded in an isolating layer of $Al_2O_3$. The lateral distance along the channel between the gate electrodes might be less than 500 nm, in particular around 300 nm.

In an embodiment of the invention, the channel comprises less than five atomic layers, such that the total thickness is less than 10 nm, preferably less than 5 nm. The channel might comprise a layered two-dimensional semiconductor as a photoactive material, such as a transition metal dichalcogenide. Transition metal dichalcogenide (TMDC) monolayers are a class of two-dimensional materials, which have the chemical formula $PX_2$, where P represents transition metals from group VI, V and VI, and X represents a chalcogen such as sulfur, selenium or tellurium. $MoS_2$, $MoSe_2$, $MoTe_2$, $WS_2$ and $WSe_2$ are TMDCs. TMDCs have layered structure with a plane of metal atoms in between two planes of chalcogen atoms. Each layer is bonded strongly in plane, but weakly in interlayers. Therefore, TMDCs can be easily exfoliated into atomically thin layers through various methods. TMDCs show layer-dependent optical and electrical properties. The band gaps of TMDCs change from indirect to direct, which makes them useful in optoelectronics. Such 2D-semiconductors not only show strong light-matter interaction and excellent optoelectronic properties, but also offer the possibility of external tunability of the potential profile in a device—and hence its photosensitivity—by electro-static doping using multi-gate electrodes.

In an embodiment of the invention, the apparatus operates as an ANN to implement an image classifier and comprises an electronic classifier circuitry which is adapted to classify the optical image, according to the detector currents $I_m$, into a number of $y_1, y_2, \ldots, y_M$ predefined categories. These different categories depend on the application and will be prepared prior during an initial training period of the classifier using a set of training images. The classifier circuitry may comprise an A/D-converter to convert the detector currents $I_m$ into digital data, and a control unit, such as a PC, to process the digital data.

In an embodiment of the invention, the apparatus operates as an ANN to implement an autoencoder to encode and decode an optical image $P_n$ into a similar optical image $P_n'$, wherein the photoresponsivity values $R_{mn}$ are automatically determined. Herein, the detector array operates as encoder, and an electronic decoder circuitry with weights $W_{nm}$ is provided to decode the M values of $I_m$ into the N values of $P_n'$. In this embodiment, an electronic comparator unit is adapted to adjust the values of $R_{mn}$ and $W_{nm}$ to minimize the error between $P_n$ and $P_n'$.

In an embodiment of the invention, the apparatus comprises an electronic control circuitry, in particular an electronic memory, which is adapted to individually provide the required photoresponsivity values $R_{mn}$ to each subpixel. This can be achieved, for example, by setting voltages $V_{mn}$ and $-V_{mn}$ at the first gate electrode and the second gate electrode of the subpixel, respectively. For this, the control circuitry can comprise a D/A-converter. It can be adapted to set the voltage at the first gate electrode and at the second gate electrode inversely, which means that when the voltage at the first gate electrode is set to $+V_G$, the voltage at the second gate electrode is set to $-V_G$. The value of $V_G$ can be, for example, around 1 V to 5 V, and it can result in a typical range of the photoresponsivity values $R_{mn}$ of, for example, −1 A/W to +1 A/W, or −60 mA/W to +60 mA/W. No explicit limitation to any of these values is intended, though. The photoresponsivity values $R_{mn}$ for each subpixel might be stored in an external electronic memory and supplied to the detector array via cabling.

In an embodiment of the invention, the subpixels each comprise two electrically isolated, floating gate electrodes, the first floating gate electrode being located near the first gate electrode and the second floating gate electrode being located near the second gate electrode. The floating gate electrodes can be around 2-nm-thick layers of Au. The floating gate electrodes can be embedded in an isolating layer of hexagonal boron nitride (hBN). Preferably, the isolation layer between the floating gate electrodes and the gate electrodes is sufficiently thin so that the floating gates can be charged when a voltage is applied to their assigned gate electrodes, for example by the electronic control circuitry, and then keep their charge for a sufficiently long time period. Once set during training, the subpixels keep their individual photoresponsivity values and deliver a photocurrent of adjustable sign and magnitude.

This embodiment has the particular advantage that it is not necessary to provide suitable voltages to all of the subpixels all the time. Instead, during the training period, each subpixel can be charged once by addressing it using a column and row decoder, standard components of, for example, digital pixel cameras. The charge is held on the floating gates and does not need to be reset for a sufficiently long time period.

In an alternative embodiment, the subpixels each comprise ferroelectric gate dielectrics.

The invention further relates to an artificial neural network for optical image recognition and classification, comprising an apparatus according to the invention, wherein the subpixels are used as artificial neurons and the photoresponsivity values $R_{mn}$ of the subpixels are used as weights of the artificial neural network. In an embodiment, the values $R_{mn}$ of the subpixels are initially determined by the photoactive areas of each subpixel within a pixel.

Further features of the invention will become apparent from the following claims, figures, and description of embodiments. Particular embodiments of the invention are described in the paper of Mennel et al., "Ultrafast machine vision with 2D material neural network image sensors", Nature 579, 62-66 (2020), published on 4 Mar. 2020 and available for download at https://doi.org/10.1038/s41586-020-2038-x, which is hereby incorporated by reference.

DETAILED DESCRIPTION

Figure 1A:
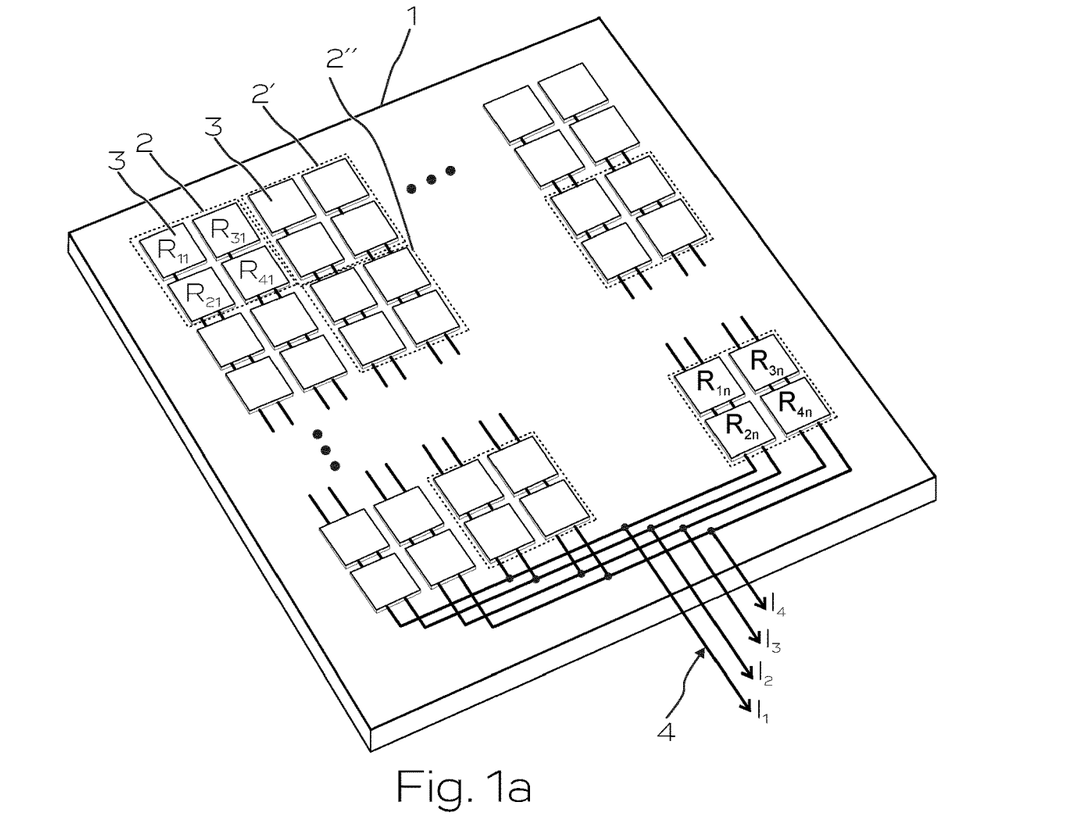
FIG. 1a shows a schematic illustration of an exemplary embodiment of a detector array according to the invention.

FIG. 1 a schematically illustrates the basic layout of a detector array 1 for an embodiment of the apparatus according to the invention. It consists of n=1, 2, ..., N photoactive pixels 2, 2', 2" arranged in a two-dimensional array, with each pixel divided into m=1, 2, ..., M subpixels 3. In this embodiment, M=4, and each pixel comprises 4 subpixels. Each subpixel 3 comprises a photodiode, which is operated under short-circuit conditions and under optical illumination delivers a photocurrent of $I_{mn}=R_{mn}·E_n·A=R_{mn}·P_n$, where $R_{mn}$ is the photoresponsivity of the subpixel 3, $E_n$ and $P_n$ denote the local irradiance and optical power at the n-th pixel, respectively, and A is the photoactive area of the subpixel. In this embodiment, each subpixel has the same photoactive area. The numbers n=1, 2, ..., N and m=1, 2, ..., M denote the pixel and subpixel indices, correspondingly. An integrated neural network and imaging apparatus is formed by interconnecting the subpixels 3 of all pixels 2, 2', 2" in parallel.

Summing all photocurrents $I_{mn}$ produced by the m-th subpixel over the N pixels results in a number of M detector currents:

$$I_m = \sum_{n=1}^{N} I_{mn} = \sum_{n=1}^{N} R_{mn} P_n$$

This operation is done by hard-wiring the outputs of subpixels 3 of all pixels 2, 2', 2" in parallel. This performs the matrix-vector product operation I=RP, with $R=(R_{mn})$ being the photoresponsivity matrix, $P=(P_1, P_2, ..., P_N)^T$ being a vector that represents the optical image projected onto the chip, and $I=(I_1, I_2, ..., I_M)^T$ being the output vector. Provided that $R_{mn}$ can be set to specific positive or negative values, various types of artificial neural networks (ANNs) for image processing can be implemented, wherein the synaptic weights are encoded in the photoresponsivity matrix $R_{mn}$.

Figure 1B:
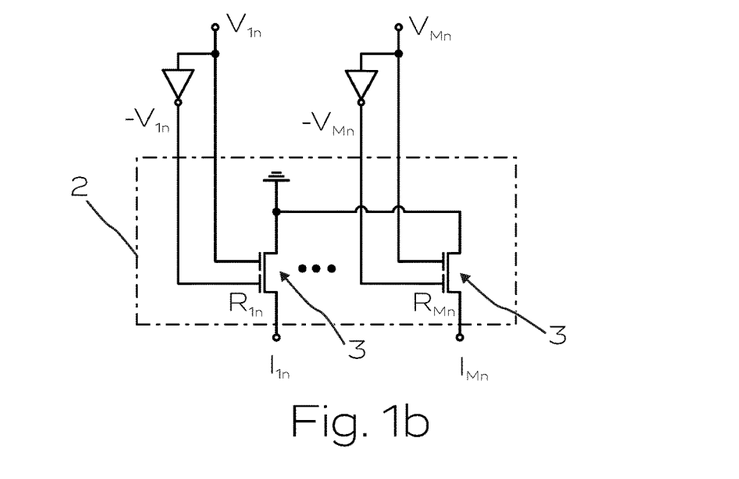
FIG. 1b shows a schematic circuit diagram of a single pixel in the detector array.

FIG. 1b shows a schematic circuit diagram of a single pixel 2 in the detector array, comprising a number M of subpixels 3. Each subpixel 3 comprises a semiconductor photodiode which is operated under short-circuited conditions. The source contacts of each photodiode are interconnected and grounded. The photodiodes feature a split gate with two gate electrodes 8, 8'.

An external electronic control circuit (not shown) provides voltages $V_{1n}, V_{2n}, ..., V_{Mn}$, which are led into the pixel 2 to supply the gate electrodes 8, 8', wherein the two gate electrodes of each subpixel 3 are biased with positive and negative voltages, respectively. A set of inverters is provided to produce the negative voltages $-V_{1n}, -V_{2n}, ..., -V_{Mn}$. The photoresponsivity of each subpixel 3 can be set independently by supplying a pair of $V_G$/-$V_G$ voltages to the two gate electrodes 8, 8'. The M drain contacts of each photodiode operate as output lines 4 of the subpixels 3 and carry the resulting photocurrent $I_{1n}, I_{2n}, ..., I_{Mn}$.

Figure 1C:
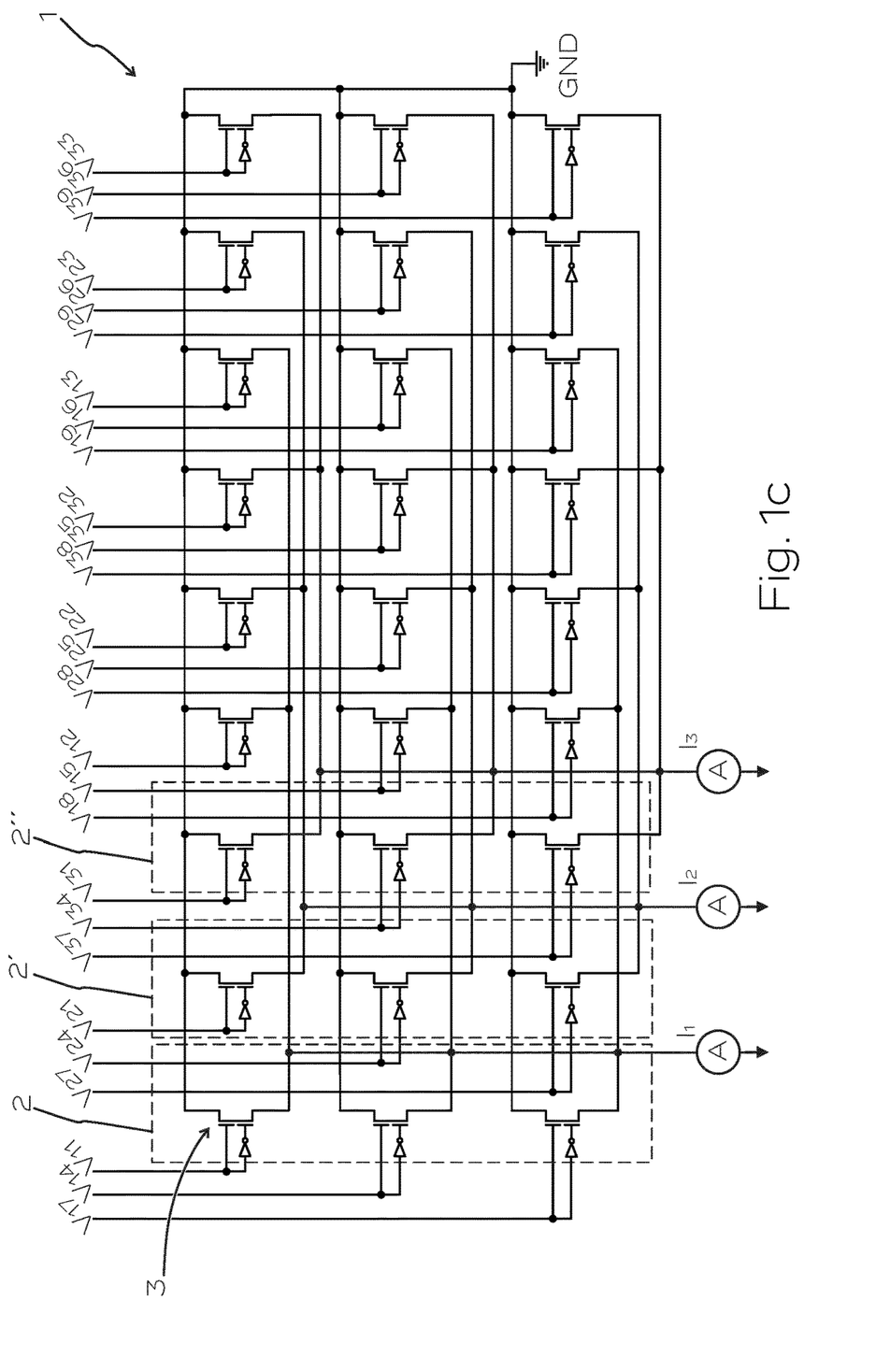
FIG. 1c shows a schematic circuit diagram of a further embodiment of a detector array.

FIG. 1c shows a further schematic circuit diagram of an embodiment of a detector array 1 consisting of 27 subpixels 3. The devices are arranged to form a 3×3 imaging array (number of pixels N=9) with a pixel size of about 17×17 µm² and with three subpixels per pixel (M=3). The short-circuit photocurrents produced by the individual devices under optical illumination are summed according to Kirchhoff's law by hard-wiring the subpixels in parallel. Each subpixel 3 is supplied with a pair of gate voltages, $V_G$ and $-V_G$, to set its responsivity individually. For training and testing of the chip, optical images were projected using an optical setup 10. Light with a wavelength of 650 nm and with a maximum irradiance of about 0.1 W cm$^{-2}$ is used.

Despite its small size, such a network with 3×3 pixels is sufficient for the application of several machine-learning algorithms. In particular, classification, encoding, and denoising of the stylized letters 'n', 'v' and 'z' can be performed.

Figure 2A:
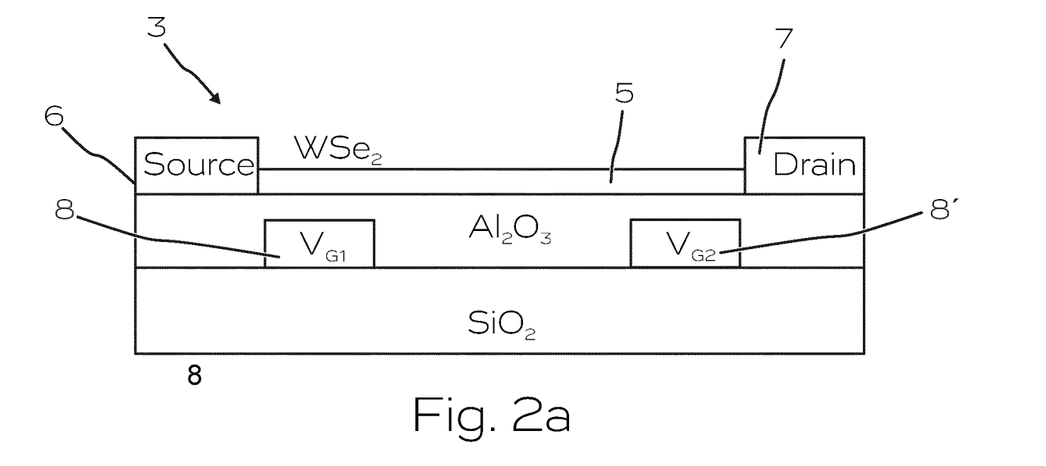
FIGS. 2a-2b show schematic illustrations of different embodiments of single subpixel photodiodes according to the invention.

FIG. 2a shows a schematic embodiment of a single subpixel 3, realized by a transistor structure with a few-layer WSe$_2$ channel 5 with a thickness of about 4 nm to form lateral p-n junction photodiodes, using split-gate electrodes 8, 8' (with a ~300-nm-wide gap) that couple to two different regions of the 2D semiconductor channel 5.

The semiconductor material WSe$_2$ was chosen because of its ambipolar conduction behavior and excellent optoelectronic properties. Biasing one gate electrode 8 at $V_G$ and the other gate electrode 8' at $-V_G$ enables adjustable (trainable) responsivities $R_{mn}$ between −60 mA/W and +60 mA/W.

A possible way of device fabrication is shortly described. As a substrate for the subpixel 3, a silicon wafer is used, which is coated with 280-nm-thick SiO$_2$. First, a bottom metal layer is formed by writing a design with electron-beam lithography (EBL) and evaporating Ti/Au (3 nm/30 nm). Then, a 30-nm-thick Al$_2$O$_3$ gate oxide is formed using atomic layer deposition. Via holes through the Al$_2$O$_3$ isolator were defined by EBL and etched with a 30% solution of KOH in deionized water. A ~70×120 µm2 WSe$_2$ flake is mechanically exfoliated from a bulk crystal and transferred onto the desired position by an all-dry viscoelastic stamping method. The thickness of the channel 5 is about six monolayers WSe$_2$, or ~4 nm, and can be estimated under an optical microscope. 27 pixels were separated from the previously transferred WSe2 sheet by defining a mask with EBL and reactive ion etching with Ar/SF$_6$ plasma. Mild treatment with reactive ion etching oxygen plasma allowed the removal of the crust from the surface of the polymer mask that appeared during the preceding etching step.

Then, a top metal layer is added by another EBL process and Ti/Au (3 nm/32 nm) evaporation. Finally, the sample was mounted in a 68-pin chip carrier and wire-bonded.

Figure 2B:
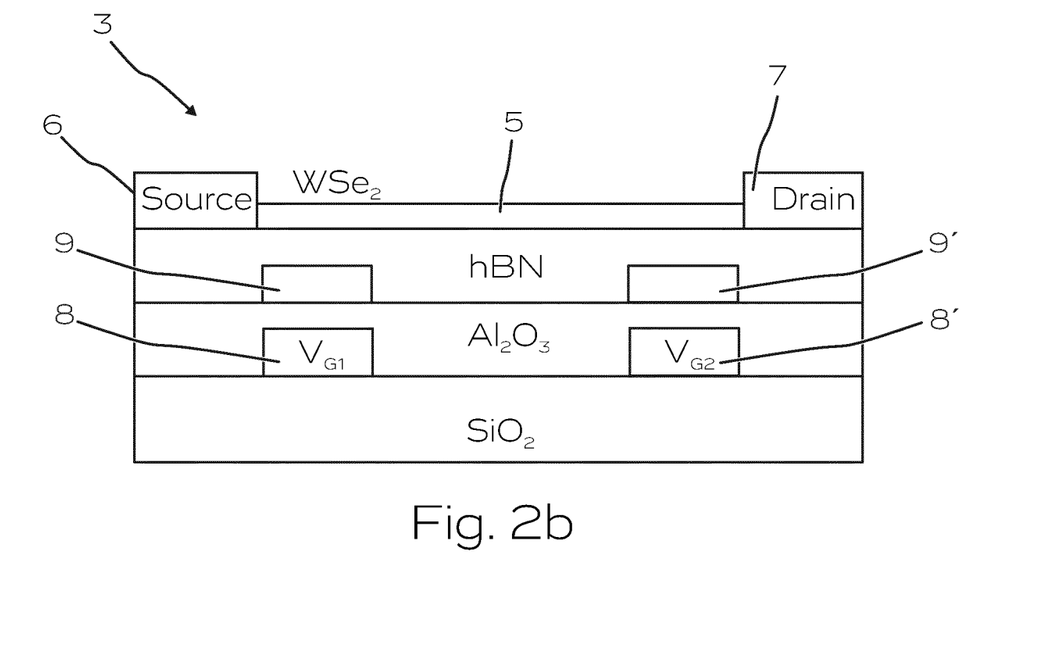

FIG. 2b shows an alternative embodiment of a single subpixel 3, realized by a transistor structure with a few-layer WSe$_2$ channel 5 with a thickness of about 4 nm to form lateral p-n junction photodiodes, using split-gate electrodes 8, 8' and floating gate electrodes 9, 9'.

The addition of 2-nm-thick Au layers, sandwiched between Al$_2$O$_3$ and hexagonal boron nitride (hBN), enables the storage of electric charge on the floating gates 9, 9' when a gate voltage is applied to the gate electrodes 8, 8'. The ability of the device to 'remember' the previous configuration can be verified from time-resolved photocurrent measurements. The voltages at the gate electrodes 8, 8' are set to $V_{G1}=+5$ V and $V_{G2}=-5$ V and are then disconnected. The use of photodiodes with floating gate electrodes 9, 9' allows to set the photoresponsivity values $R_{mn}$ of the subpixels 3 consecutively, by addressing the gate electrodes 8, 8' of each subpixel separately, whereby electrical charge is transferred to the floating gate electrodes 9, 9', where it is stored for operation of the detector. Repeated refreshing cycles might be necessary, but it is not necessary to constantly provide electric energy to the apparatus during operation.

Figure 3A:
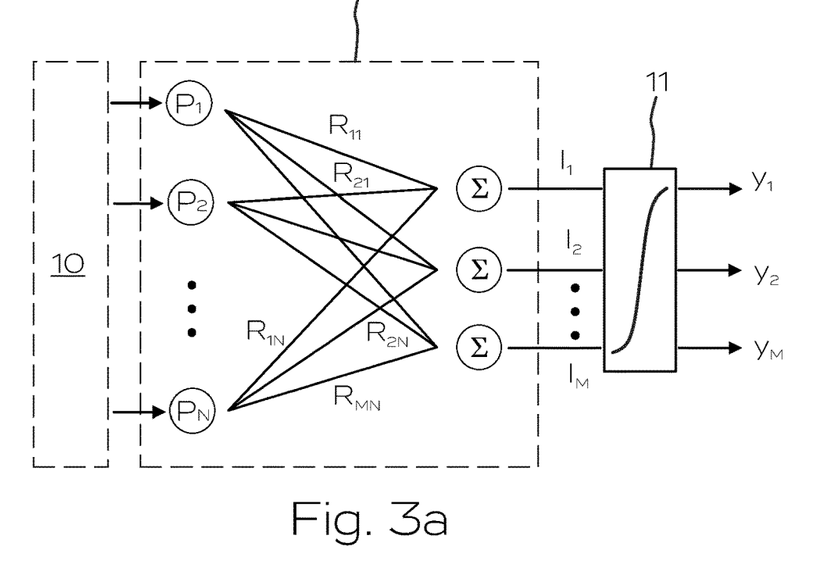
FIGS. 3a-3b show schematic applications of an apparatus according to the invention as ANNs implementing a classifier and an autoencoder.

FIG. 3a shows a schematic embodiment of an apparatus according to the invention operating as a single-layer perceptron to classify optical images, using non-linear activation functions in an electronic non-linear classifier circuitry 11 that is implemented off-chip. This type of ANN represents a supervised learning algorithm that is capable of classifying images represented by $P_n$ into different categories $y_m$.

For supervised training of the ANN, a set of predefined images, such as letters on an optical matrix, for example the letters "n", "v", and "z" on a 3×3 matrix, is optically projected, via the optical setup 10, to the detector array 1. Gaussian noise is added to augment the input data. In such a supervised learning example, one-hot encoding can be applied, wherein each of the three letters activates a single output node/neuron. As activation function (the nonlinear functional mapping between the inputs and the output of a node) for the M photocurrents the softmax function $$\phi_m(I) = \frac{e^{I_m \xi}}{\sum_{k=1}^{M} e^{I_k \xi}}$$

can be chosen, where a scaling factor $\xi=10^{10}$ A$^{-1}$ is used to ensure that the full value range of the activation function is accessible during training. As a loss/cost function (the function to be minimized during training) the cross-entropy $$\mathcal{L} = -\frac{1}{M} \sum_{m=1}^{M} y_m \log[\phi_m(I)]$$

can be used, where $y_m$ is the label and M=3 is the number of classes. The activations of the output neurons represent the probabilities for each of the letters. The initial values of the responsivities are randomly chosen from a Gaussian distribution, and were different for supervised- and unsupervised learning. The responsivities are updated after every epoch by backpropagation of the gradient of the loss function $$R_{mn} \rightarrow R_{mn} - \frac{\eta}{S} \sum_{P} \nabla_{R_{mn}} \mathcal{L}$$

with learning rate $\eta=0.1$. A detailed flow chart of a possible embodiment of the training algorithm is shown in FIG. 3c.

Figure 3B:
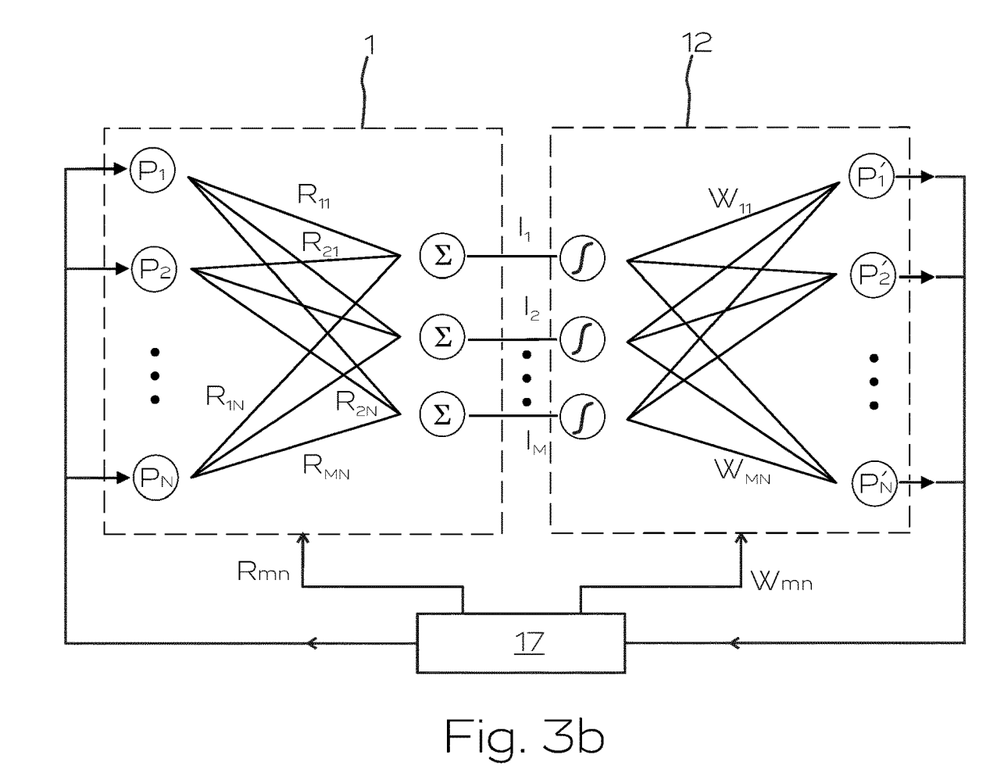
Figure 3C:
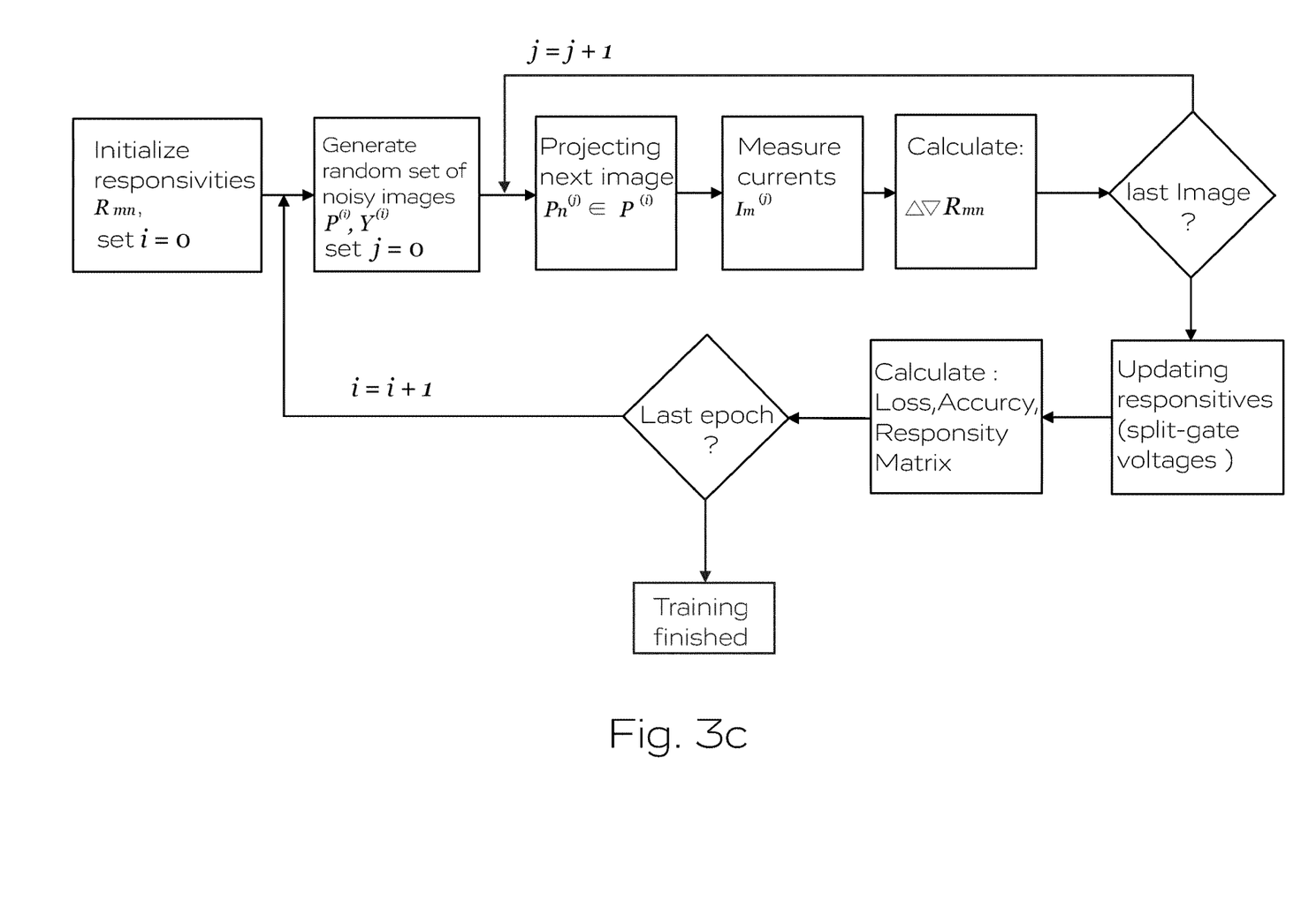
FIG. 3c shows a simplified flow chart of the training algorithm for an ANN according to the invention.

FIG. 3b shows a schematic embodiment of an apparatus according to the invention operating as an autoencoder. Such an ANN can learn, in an unsupervised training process, an efficient representation (encoding) for a set of images $P=(P_1, P_2, \ldots, P_n)$. Along with the encoder, an electronic non-linear decoder circuitry 12 is trained to reproduce at its output the original image, $P' \approx P$, from the encoded data. Here the encoder is realized by the detector array itself, and the decoder is realized by the external electronic decoder circuitry 12. An electronic comparator unit 17 compares P' with P and adjusts the photosensitivity values $R_{mn}$ and the weights $W_{mn}$. Logistic (sigmoid) activation functions can be chosen for the code neurons $$\phi_m(I) = \frac{1}{1+e^{-I_m \xi}}$$

again with $\xi=10^{10}$ A$^{-1}$ as a scaling factor, as well as for the output neurons $$P'_n = \phi_n(z_n) = \frac{1}{1+e^{-z_n}}$$

where $$z_n = \sum_{m=1}^{M} W_{nm} \phi_m(I_m)$$

and $W_{nm}$ denotes the weight matrix of the decoder. The mean-square loss function can be used which depends on the difference between the original and reconstructed images. The responsivities are again trained by backpropagation of the loss, with a noise level of $\sigma=0.15$. Along with the encoder responsivities, the weights of the decoder $W_{nm}$ can be trained as well. As image sensing and processing are both performed in the analogue domain, the operation speed of the system is limited only by physical processes involved in the photocurrent generation. As a result, image recognition and encoding occur in real time with a rate that is orders of magnitude higher than what can be achieved conventionally.

FIG. 3c shows a simplified flow chart of the training algorithm for an ANN using an apparatus according to the invention. This training algorithm can be applied by a setup as shown in FIG. 4.

Figure 4:
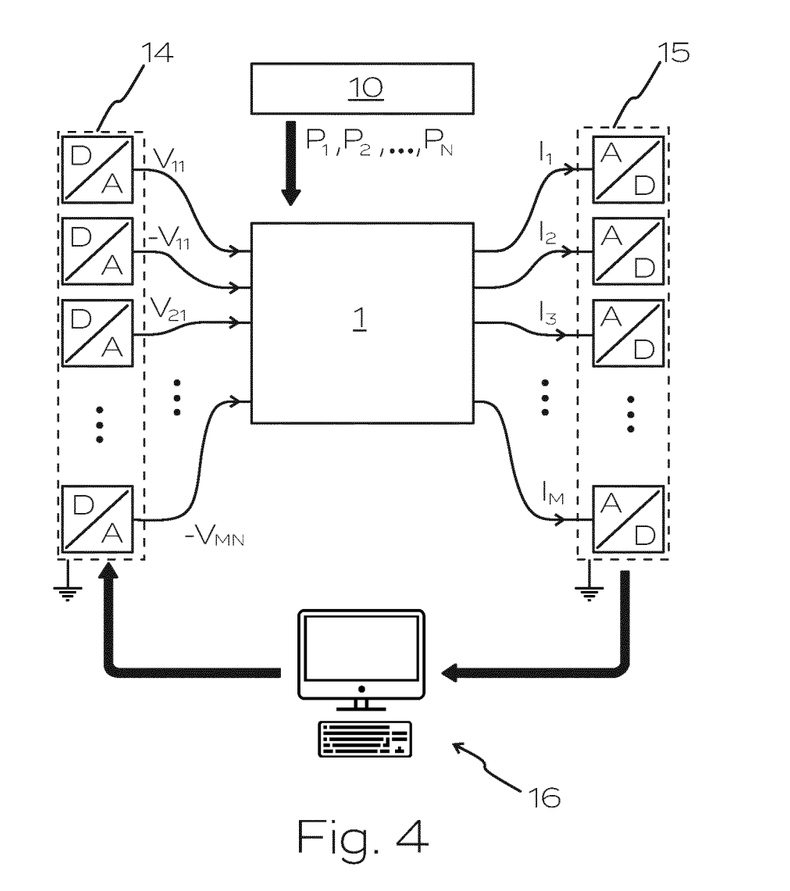
FIG. 4 shows an experimental setup to classify optical images with an apparatus according to the invention.

FIG. 4 shows an experimental setup to demonstrate the high-speed capabilities of an apparatus according to the invention. In an optical setup 10, light from a semiconductor laser (650 nm wavelength) was linearly polarized before it illuminated a spatial light modulator (SLM), operated in intensity-modulation mode. On the SLM, optical images in the form of different letters were displayed and the polarization of the light was rotated depending on the pixel value. A linear polarizer with its optical axis oriented normal to the polarization direction of the incident laser light functioned as an analyzer. The generated optical image was then projected by the optical setup 10 onto the detector array 1. Pairs of gate voltages were supplied to each of the subpixels 3 using a total of 54 D/A-converters 14 and the three output currents were measured by A/D-converters 15. The output current signals were amplified and provided to a control unit 16. Correct pattern classification within ~50 ns could be demonstrated. The system is thus capable of processing images with a throughput of 20 million bins per second. This value is limited only by the bandwidth of the used amplifiers, and substantially higher rates are possible.

Figure 5A:
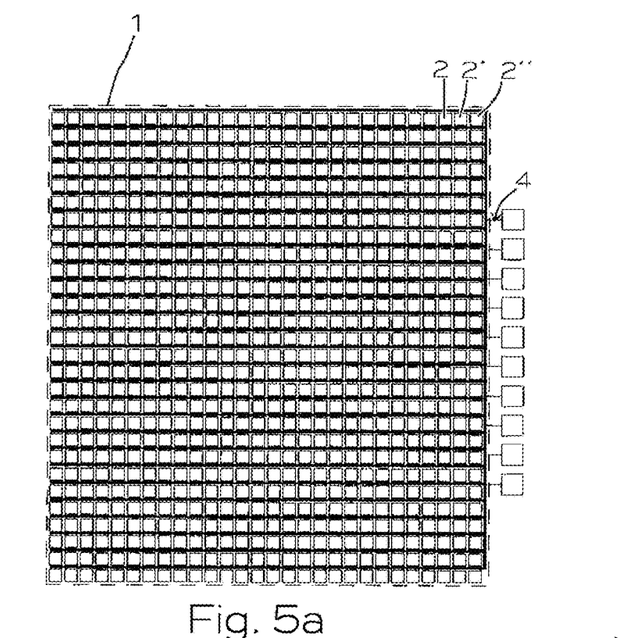
FIGS. 5a and 5b show a further embodiment of a detector array according to the invention.
Figure 5B:
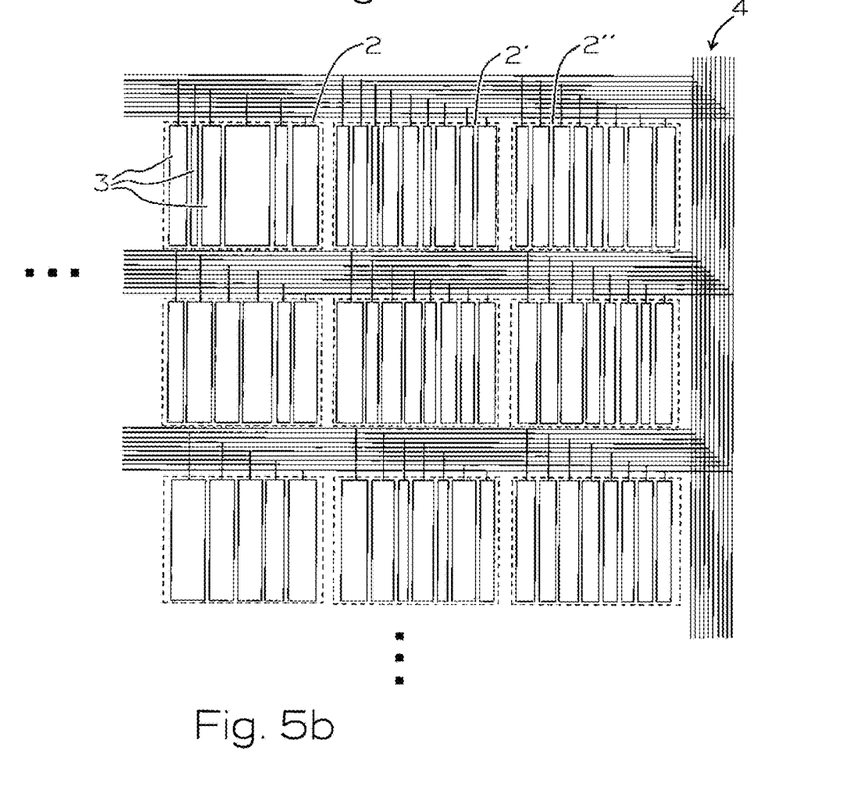

FIGS. 5a-5b show a further embodiment of a detector array 1 according to the invention in microscopic top view. The detector array 1 comprises a matrix of 28×28 pixels 2, 2', 2", so that N=784. Each pixel 2, 2', 2" is segmented into a linear arrangement of up to ten subpixels 3, so that M=10. In this embodiment, some pixels have less than M subpixels. Each subpixel 3 comprises a GaAs-Schottky photodiode with a rectangular photoactive area as shown in the detail FIG. 5b. Each subpixel 3, under optical illumination, delivers a photocurrent $I_{mn}$ depending on its photoresponsivity $R_{mn}$ and the local optical power $P_n$ received at the pixel. The outputs of each subpixel 3 over all pixels are connected to form m=1, 2, . . . , M output lines 4, wherein each output line 4 sums the photodetector currents (if any) produced by the m-th subpixels 3 in all 784 pixels 2, 2', 2" and delivers, at the ten output terminals, a detector current $I_m$ to be used for recognizing and classifying the optical image.

The photoresponsivity values $R_{mn}$ of the subpixels 3 within a pixel 2, 2', 2" are not identical and are determined by the rectangular photoactive area of the subpixel 3. The different photoactive areas of the 10 subpixels within each pixel are shown in FIG. 5b, which shows a detailed view of 3×3 pixels from FIG. 5a. The subpixels 3 have non-identical photoactive areas, which results in a different photoresponsivity values $R_{mn}$ for each subpixel 3. Some of the pixels 2, 2', 2" have less than 10 subpixels 3, so that the respective subpixel 3 has a photoresponsivity value of zero. The necessary areas are determined, preferably by simulation, prior to fabrication of the detector array 1 in order to classify, in this embodiment, the ten handwritten numerals "0" to "9", corresponding to ten distinct output lines 4. Thus, the responsivity values $R_{mn}$ are fixed and cannot be changed during operation. The detector array of this embodiment does not need a power supply and immediately delivers currents on the ten output lines 4 upon proper illumination. Projecting the numeral "0" leads to current on the first output terminal, projecting the numeral "1" leads to current on the second output terminal, and so on.

An apparatus according to the invention can be used for ultrafast recognition and encoding of optical images, it is easily scalable and provides various possibilities for ultrafast machine vision applications, such as ultrafast spectroscopy. The implementation of an analogue deep-learning network becomes feasible by converting the M photocurrents into voltages that are then fed into a memristor crossbar. Besides on-chip training, the network can also be trained off-line using computer simulations, and the predetermined photoresponsivity matrix is then transferred to the device.

Using an apparatus according to the invention in an ANN may provide new opportunities for ultrafast machine vision, for example in the realm of accident prevention or for autonomous driving applications. It may also be employed in ultrafast spectroscopy for the detection and classification of spectral events. In such applications, incoming light can be separated through a grid into a number of discrete wave lengths, which are then detected using an apparatus according to the invention. In this case, a one-dimensional array of pixels might be sufficient. It is further noted that the operation of an apparatus according to the invention can be self-powered, so that electrical energy is consumed only during training.

Embodiments of the invention can be implemented in digital electronic circuitry, in tangibly-embodied computer software or firmware, in computer hardware, including the structures disclosed in this specification and their structural equivalents, or in combinations of one or more of them. Embodiments of the invention can be performed by, and apparatus can also be implemented as, special purpose logic circuitry, such as an FPGA (field programmable gate array), an ASIC (application specific integrated circuit), or a GPU (General purpose graphics processing unit). Computers suitable for the execution of the method according to the invention can be based on either of general or special purpose microprocessors, or any other kind of central processing unit (CPU). Such central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of the invention. Certain features that are described in this specification in the context of separate embodiments can also be implemented in combination in a single embodiment. Other embodiments are within the scope of the following claims.

LIST OF NUMERALS

1 Detector array
2, 2', 2" Pixel
3 Subpixel
4 Output line
5 Channel
6 Source Contact
7 Drain Contact
8, 8' Gate electrode
9, 9' Floating gate electrode
10 Optical setup
11 Classifier circuitry
12 Decoder circuitry
13 Control circuitry
14 D/A-Converter
15 A/D-Converter
16 Control unit
17 Comparator unit

The invention claimed is:

1. An apparatus for optical image recognition and classification, comprising:
   an optical setup to split the optical image into n=1, 2, . . . , N local optical power values $P_n$,
   a detector array with n=1, 2, . . . N photoactive pixels to pick up the local optical power values $P_n$, wherein
   each pixel is segmented into subpixels, and
   each subpixel comprises a semiconductor photodiode which, under optical illumination, delivers a photocurrent depending on its photoresponsivity value and the local optical power $P_n$ received at the pixel,
wherein
   the photoresponsivity values of the subpixels within a pixel are not identical, and the outputs of the subpixels of each pixel are connected to form a number of separate output lines, wherein each output line sums the photodetector currents produced by different subpixels within each pixel and delivers a number of detector currents to be used for recognizing and classifying the optical image.

2. The apparatus according to claim 1, wherein each pixel is segmented into m=1, 2, . . . , M subpixels, and the outputs of the subpixels of each pixel are connected to form M output lines.

3. The apparatus according to claim 1, wherein the number of subpixels within each pixel is not identical.

4. The apparatus according to claim 1, wherein each pixel comprises an identical number of M subpixels.

5. The apparatus according to claim 1, wherein the photoresponsivity values $R_{mn}$ of the subpixels depend on the photoactive areas of the subpixel, and the photoactive areas of each subpixel within a pixel are not identical.

6. The apparatus according to claim 1, wherein the photoresponsivity values $R_{mn}$ of the subpixels are adjustable during operation, preferably by electrical means.

7. The apparatus according to claim 1, wherein the subpixels each comprise a semiconductor channel, for example of Si, GaAs, or other semiconducting materials, which is contacted by a source contact and a drain contact, wherein the source contact is grounded, and the drain contact forms the output of the subpixel.

8. The apparatus according to claim 6, wherein a lateral p-n junction is formed in the channel and two gate electrodes are provided, the first gate electrode located near the source contact, and the second gate electrode located near the drain contact, such that the built-in field over the p-n junction can be adjusted by applying a voltage at the gate electrodes.

9. The apparatus according to claim 6, wherein the channel comprises a layered two-dimensional semiconductor including a transition metal dichalcogenide that includes layered tungsten diselenide ($WSe_2$) or layered molybdenum disulfide ($MoS_2$) with less than five atomic layers and a total thickness of less than 10 nm.

10. The apparatus according to claim 1, wherein the apparatus operates as an image classifier and comprises an electronic classifier circuitry which is adapted to classify the optical image, according to the detector currents $I_m$, into a number of $y_1, y_2, \ldots y_M$ predefined categories.

11. The apparatus according to claim 1, wherein the apparatus operates as an autoencoder, in particular as a binary-hashing autoencoder, to encode/decode $P_n$ into $P_n'$, wherein the detector array operates as encoder, and an electronic decoder circuitry with weights $W_{nm}$ is provided to decode the M values of $I_m$ into the N values of $P_n'$, wherein an electronic comparator unit is provided to adjust the values of $R_{mn}$ and $W_{nm}$ to minimize the error between $P_n$ and $P_n'$.

12. The apparatus according to claim 1, wherein the apparatus comprises an electronic control circuitry, in particular an electronic memory, which is adapted to individually provide the photoresponsivity $R_{mn}$ of each subpixel, in particular by setting voltages $V_{mn}$ and $-V_{mn}$ at the first gate electrode and the second gate electrode.

13. The apparatus according to claim 11, wherein the control circuitry is adapted to set the voltage at the first gate electrode to $+V_G$ and at the second gate electrode to $-V_G$, with $V_G$ at around 1 V to 5 V, resulting in a range of the photoresponsivity $R_{mn}$ of $-1$ A/W to $+1$ A/W.

14. The apparatus according to claim 7, wherein the subpixels each comprise two electrically isolated, floating gate electrodes, the first floating gate electrode being located near the first gate electrode and the second floating gate electrode being located near the second gate electrode, wherein the isolation layer between the floating gate electrodes and the gate electrodes is sufficiently thin so that they can be charged when a voltage is applied to the gate electrodes.

15. The apparatus according to claim 13, wherein the gate electrodes are embedded in an isolating layer of $Al_2O_3$, and the floating gates are embedded in an isolating layer of hexagonal boron nitride (hBN).

16. The apparatus according to claim 13, wherein the floating gate electrodes are around 2-nm-thick layers of Au.

17. The apparatus according to claim 1, wherein each pixel is segmented into a linear array or a rectangular matrix of M subpixels.

18. An artificial neural network for optical image recognition and classification, wherein the artificial neural network comprises an apparatus according to claim 1, wherein the subpixels are used as artificial neurons and the photoresponsivity values $R_{mn}$ of the subpixels are used as weights of the artificial neural network.

19. The artificial neural network according to claim 18, wherein the values $R_{mn}$ of the subpixels are initially set during fabrication of the detector array by designing the photoactive areas of each subpixel within a pixel at a predetermined value, resulting in a predetermined value of $R_{mn}$ for each subpixel.

20. The artificial neural network according to claim 19, wherein the values $R_{mn}$ of the subpixels are adjustable during operation by electrical means, in particular by applying voltages at gate electrodes.

21. The artificial neural network according to claim 20, wherein the values $R_{mn}$ of the subpixels are adjustable during a training period by electrical means, in particular by consecutively applying voltages at gate electrodes, whereby electric charge is stored at floating gate electrodes which are assigned to the gate electrodes.

* * * * *